United States Patent Office 2,796,440
Patented June 18, 1957

2,796,440

PREPARATION OF ALKOXY-BENZYLHALIDES

Marrine A. Terpstra, Kirkwood, and Ferdinand B. Zienty, Brentwood, Mo., assignors to Monsanto Chemical Company, St. Louis, Mo., a corporation of Delaware No Drawing. Application February 11, 1953,
Serial No. 336,444

8 Claims. (Cl. 260—613)

This invention relates to the preparation of nuclear substituted benzyl halides, aralkyl hadies, and more specifically pertains to the preparation of alkoxybenzyl halides.

Aralkyl halides are useful intermediates in the synthesis of such complex organic compounds as dyes and pharmaceuticals. For example, such aralkyl halides as the dialkoxy especially dimethoxy and diethoxybenzyl halides are employed in the synthesis of papaverine and analogues of papaverine which are useful as antispasmodics and coronary dilators.

Numerous methods have been proposed for the preparation of benzyl and nuclear substituted benzyl halides. In general, these processes are carried out in an anhydrous reaction medium. One method heretofore proposed involves the reaction of thionyl chloride with the corresponding alcohol. For example, 3,4-dimethoxybenzyl (veratryl) alcohol is reacted with thionyl chloride in the presence of calcium chloride. Another method proposed involves reacting an anhydrous hydrohalide with the corresponding alcohol. For example, anhydrous hydrogen chloride is passed through a benzene or ether solution of veratryl alcohol to produce veratryl chloride. Also it has been proposed to chloromethylate the corresponding aromatic or nuclear substituted aromatic compound. For example, benzyl chloride can be prepared by the chloromethylation of benzene in the presence of zinc chloride and veratryl chloride can be produced by the chloromethylation of veratrole at about 0° C. with aqueous formaldehyde and dry hydrogen chloride.

Of these proposed processes, the reaction of a nuclear substituted benzyl alcohol with an anhydrous hydrohalide, preferably anhydrous HCl, has been most extensively used especially for the preparation of dialkoxy benzyl chlorides. In general, the reaction is carried out by passing anhydrous HCl vapors into a cooled solution of the nuclear substituted benzyl alcohol. Although this process has been more widely used than the other proposed processes, it has not given uniform reproducible results. The conversion of the benzyl alcohol to the desired chloride has been erratic and therefore the production of antispasmodics therefrom has been most erratic. Accordingly, a process for making nuclear substituted benzyl chlorides in consistently high yields would not only be desirable but would also be a substantial contribution to the art.

It is an object of this invention, therefore, to provide a method whereby high yields of nuclear substituted benzyl chlorides can be consistently obtained. It is also an object of this invention to provide a process for preparing nuclear substituted benzyl chlorides, especially dialkoxy benzyl chlorides in consistent high yields by a simple process readily adaptable to use with standard industrial equipment. Other objects of this invention will be apparent from the following description.

The objects of this invention can be accomplished by carrying out the hydrohalogenation of a nuclear substituted benzyl alcohol in a substantially anhydrous system having an iron concentration of 10 p. p. m. or below and preferably in a system substantially free from iron, i. e. an iron concentration of less than 1.0 p. p. m. Although the deleterious effect of the presence of iron in the reaction medium is not fully understood, it has been found that the presence of only 50 p. p. m. of iron in the reaction medium reduced the yield of dialkoxy benzyl chloride to less than 65% of theory based on the alcohol employed. It was also discovered that as the iron concentration decreased, the yield of the desired benzyl halide increased and that yields of the nuclear substituted benzyl halides in excess of 85% could be obtained when the iron concentration was below 10 p. p. m. and when the iron concentration was 1.0 p. p. m. or less yields of from 95% to 99% of the desired benzyl halide could be obtained.

The iron content of the reaction medium can be readily reduced to the preferred range by adding a small amount of dilute hydrochloric acid to the diluent or reactant and then washing them with water. After separating the water from the diluent or reactant alcohol they are tested for iron content. If the iron content is still above the desired range a second washing with hydrochloric acid and water will generally reduce the iron content to within the preferred range. The washed diluent and the reactant alcohol can be dried before charging to the reactor or they can be used without drying, if desired, for the small amount of water present in the diluent and reactant alcohol has little or no effect on the hydrochlorination reaction.

According to the process of this invention, the nuclear substituted benzyl halides are prepared in the presence of an inert reaction diluent. Preferably the reaction diluent is a solvent for both the aralkyl alcohol reactant and the aralkyl halide product and is water-insoluble. Thus, the reaction can be carried out in the presence of ethers such as diethyl ether and petroleum ether, carbon tetrachloride, chloroform and other reaction diluents commonly employed in the laboratory. There can also be employed as the reaction diluent a liquid hydrocarbon such as the saturated aliphatic carbons from $C_5$ to $C_{15}$ and the liquid aromatic hydrocarbons as well as chlorinated derivatives of such hydrocarbons. More specifically there can be employed as the reaction diluent such liquid hydrocarbons as heptane or a mixture of aliphatic hydrocarbons such as gasoline or kerosene, or aromatic hydrocarbons such as benzene, toluene, the xylenes, trimethyl benzenes, ethylbenzene, ethyl toluenes, propylbenzene, tetramethyl benzenes, and the like as well as mixtures of aromatic hydrocarbons. The liquid chlorinated derivatives of aliphatic and aromatic hydrocarbons which can be employed as reaction diluents are, for example, mono- and dichlorobutanes, mono- and dichloropentanes, mono- and dichloroheptanes, mono-chlorobenzene, monochlorotoluenes, dichlorobenzenes, and the like.

The preferred alcohols which can be employed as reactants according to this invention possess the formula

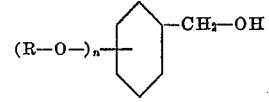

wherein R is an alkyl group containing one to five carbon atoms and n is a number from 0 to 2 inclusive. Thus, the preferred aralkyl alcohols include benzyl alcohol and the mono- and dialkoxybenzyl alcohols. R in the the above formula can be methyl, ethyl, n-propyl, isopropyl, n-butyl, sec.-butyl, tert.-butyl, amyl, tert.-amyl, isoamyl and the like. R as well as the ring can also contain such substituted groups as halogen, nitro, hydroxy, alkoxy, aryl, aryloxy, aralkyl, aralkoxy, etc. Specific members of this preferred class of alcohols include among others 4-ethoxybenzyl alcohol, 2-butoxybenzyl alcohol, 2,3-dimethoxybenzyl alcohol-(o-veratryl alcohol), 3,4-dimethoxybenzyl alcohol - (veratryl alcohol), 3,4,5 - trimethoxybenzyl alcohol, 2,4,5-trimethoxybenzyl alcohol, 3-methoxybenzyl alcohol, 4-methoxybenzyl alcohol, 2,3-diethoxybenzyl alcohol, 4-ethoxy-3,5-dimethoxybenzyl alcohol, 3 - methoxy - 4 - ethoxybenzyl alcohol, 3,4 - diethoxybenzyl alcohol, 3,4-dipropoxybenzyl alcohol, 3,4-dibutoxybenzyl alcohol, 3,4-diisopropoxybenzyl alcohol, 2-propoxybenzyl alcohol, 2-isoamoxybenzyl alcohol, 3-propoxy-4-methoxybenzyl alcohol, 3-ethoxy-4-isopropoxybenzyl alcohol, 3-propoxy-4-ethoxybenzyl alcohol, 3-isopropoxy - 4- methoxybenzyl alcohol, 2 - ethoxy - 3-methoxy-5-nitrobenzyl alcohol, 4-ethoxy 2 (and 3) nitrobenzyl alcohol, 2,5-dimethoxy-3-methylbenzyl alcohol, 2,5-dimethoxy-3,4,6-trimethylbenzyl alcohol, 3,6-dimethoxy-2,4,5-trimethylbenzyl alcohol, 4-hydroxy-3,5-dimethoxybenzyl alcohol, 2-hydroxy-3-methoxybenzyl alcohol (o-vanillyl alcohol), 3 - hydroxy - 4 - methoxybenzyl alcohol-(isovanillyl alcohol), 4-hydroxy-3-methoxybenzyl alcohol-(vanillyl alcohol), 2,3-diethoxy-5-nitrobenzyl alcohol, 2-methoxy-5-propylbenzyl alcohol, 2-isopropoxy-5-methylbenzyl alcohol, 3-methoxy-4-benzyloxybenzyl alcohol, 3-benzyloxy-4-ethoxybenzyl alcohol, 2-benzyloxy-3-methoxybenzyl alcohol, 2,3-methylenedioxybenzyl alcohol and 3,4-methylenedioxybenzyl alcohol (piperonyl alcohol).

As hereinbefore stated, the aralkyl halides are employed as intermediates in the synthesis of other organic chemical compounds and because of this utility are preferably employed as chlorides. In addition, hydrochloric acid is the lowest in cost of the hydrohalic acids. Furthermore, hydrochloric acid has the least tendency to produce undesirable side reactions. It is for these reasons that this invention will be described in detail with the use of hydrochloric acid as a reactant. It will be understood that hydrobromic and hydroiodic acids can also be employed to prepare the corresponding bromides and iodides.

More specifically, aralkyl halides and especially nuclear substituted benzyl chlorides such as the dialkoxy benzyl chlorides can be prepared according to this invention by adding substantially anhydrous HCl to a cool solution of the corresponding alcohol in the inert liquid diluent. It is preferred that the hydrochlorination process be carried out at a temperature below about 10° C. The hydrochlorination is continued until substantially all of the alcohol reactant is converted to the desired chloride. This completion of the hydrochlorination can be readily determined by withdrawing a sample of the reaction mixture, washing the sample and determining the percentage bound chloride in the usual manner. The process of this invention is described in detail in the following specific examples wherein the term "parts" is employed to indicate parts by weight.

EXAMPLE I

To a reactor fitted with a stirrer, a dip tube for charging HCl and a means for cooling the reaction medium there was added 118 parts of monochlorobenzene purified by distilling in glass equipment. The monochlorobenzene was stirred and cooled to 0° C. The dip tube was adjusted so that it discharged below the surface of the monochlorobenzene. The reactor was purged of air with HCl by allowing the pressure to build up to about 8 inches of water and venting the air-HCl mixture. A solution of 52 parts of 3-methoxy-4-ethoxybenzyl alcohol in 59 parts of monochlorobenzene (both the benzyl alcohol and monochlorobenzene had been purified by distillation in glass equipment) in a stainless steel supply tank was put under air pressure of 5 pounds per square inch. When the reactor had been purged and the monochlorobenzene therein had been cooled to 0° C. the solution of the alcohol in monochlorobenzene and the HCl were charged to the reactor at such a rate as to maintain a reaction temperature between 0° C. and 4° C. while the reaction mixture was stirred. Addition of HCl was continued for about 15 minutes after all the alcohol solution had been added. All inlet and vent lines were shut off and no pressure drop was detected. A portion of the reaction mixture was withdrawn, washed with ice water, and one milliliter samples were titrated with silver nitrate to determine bound chloride. From the bound chloride assay it was found that the yield of 3-methoxy-4-ethoxybenzyl chloride was 99.5% of theory.

After the bound chloride determination had been completed, the reaction mixture was quenched with ice water, the water layer separated from the organic layer and the solution of the dialkoxybenzyl alcohol in monochlorobenzene was charged to the next process step.

The above example illustrates that substantially quantitative yields of nuclear substituted benzyl halides can be obtained in a completely iron free system. However, it is not practical in industrial application to distill the solvent diluent and the reactant alcohol to obtain an iron free reaction medium. Furthermore, when dialkoxy benzyl alcohols are distilled even at reduced pressure, 10% or more of the alcohol is lost through the formation of extremely high boiling material. Consequently, the reduction of iron content by washing with dilute HCl is far more satisfactory even if all the iron is not removed.

The following examples illustrate the effect of iron on the conversion of nuclear substituted benzyl alcohols to the corresponding halides.

EXAMPLES II TO V

In these preparations the process of Example I was repeated except that 100 parts of monochlorobenzene containing sufficient ferric chloride to give the desired iron concentration was charged to the reactor and a solution of 46.5 parts of 3-methoxy-4-ethoxybenzyl alcohol in 67.5 parts of monochlorobenzene was charged concurrently with the HCl. The iron concentration, the reaction temperature and the percent yield of the dialkoxybenzyl chloride are shown in Table I below.

Table I

EFFECT OF IRON ON HYDROCHLORINATION OF DI ALKOXY-BENZYL ALCOHOL

| Example | Iron Content, p. p. m. | Reaction Temperature, °C. | Yield, Percent Theory |
|---|---|---|---|
| II | 50 | −1 to 2 | 63 |
| III | 10 | 2 to 5 | 84 |
| IV | 5 | 1.5 to 3 | 88 |
| V | 1 | 1.5 to 3 | 98 |

EXAMPLE VI

To a reactor similar to that described in Example I there was charged 275 parts of toluene which had been washed with dilute hydrochloric acid until its iron content was less than 1.0 p. p. m. While the toluene was being stirred and cooled to 0° C., a solution containing 125 parts of 3,4-diethoxybenzyl alcohol washed with dilute hydrochloric acid until its iron content was less than 1.0 p. p. m. dissolved in 191 parts of washed iron free toluene was placed in a charging tank. When the toluene in the reactor was at 0° C., air pressure of about 5 pounds per square inch was applied to the charging tank, the charging line to the reactor was opened and HCl was charged into the reactor at a controlled rate so that a reaction temperature between 0° C. and 5° C. could be maintained. About 15 minutes after the solution of the alcohol had been added, the HCl was shut off and the reactor's atmospheric vent was shut off. There was no drop in the internal pressure in the reactor indicating that reaction had stopped. A portion of the reaction mixture was withdrawn, washed with water and titrated with a standard silver nitrate solution to determine bound chloride. From this analysis it was found that the yield of 3,4-diethoxy benzyl chloride was 99% of theory. To the reaction mixture in the reactor there was added ice water as a quench. The water layer was separated from the organic layer and the organic layer was charged to a cyanation reactor.

EXAMPLE VII

The process of Example VI was repeated except that a solution containing 125 parts of 3,4-dimethoxy benzyl alcohol in 191 parts of toluene, both washed with dilute hydrochloric acid to an iron content of 1.0 p. p. m., were charged concurrently with HCl. The sample of the reaction mixture taken after the hydrochlorination was complete was titrated with a standardized silver nitrate solution to determine the bound chloride content. From this analysis the yield of 3,4-dimethoxy benzyl chloride was found to be 97% of theory.

Any of the other nuclear substituted benzyl alcohols can be hydrochlorinated to the corresponding benzyl chlorides by the process of this invention in the manner described in the specific examples, and comparable yields will be obtained where the iron content of the reaction medium is 10 p. p. m. or less. Substantially quantitative yields can be obtained when the iron content of the reaction medium is 1.0 p. p. m. or less.

Included within the scope of this invention is the modification of the process described in Examples I to VII wherein all of the diluent and the benzyl alcohol are charged to the reactor at one time and the hydrohalide is passed into the solution. Only one specific example of this modification will be presented to avoid undue repetition.

EXAMPLE VIII

To a reactor described in Example I there is charged 177 parts of monochlorobenzene which had been washed with dilute hydrochloric acid and water until its iron content was less than 1.0 p. p. m. Then 3-methoxy-4-ethoxy benzyl alcohol whose iron content was also less than 1.0 p. p. m. is added to the monochlorobenzene. The resulting solution is stirred and cooled to about 0° C. The reaction system is purged of air as hereinbefore described and then HCl was passed into the solution through the dip tube. The reaction mixture is stirred and the reaction temperature is maintained at about 5° C. The addition of HCl is discontinued when no more is being absorbed. This point is determined by shutting off the vent and the HCl feed and observing the pressure in the reactor. When the pressure does not drop, the hydrochlorination is complete. The yield of the desired benzyl chloride is determined by determining the bound chloride content of the reaction mixture as before described.

By the above method, yields above 95% of 3-methoxy-4-ethoxy benzyl chloride, 3,4-dimethoxy benzyl chloride and 3,4-diethoxy benzyl chloride have been obtained. By substituting other of the nuclear substituted benzyl alcohols in the above described process, similar yields of the corresponding nuclear substituted benzyl halides can be obtained.

What is claimed is:

1. In the preparation of a dialkoxy benzyl chloride by the hydrochlorination of the corresponding alcohol, the step comprising reacting under substantially anhydrous reaction conditions hydrogen chloride with a dialkoxy benzyl alcohol containing 1 to 5 carbon atoms in the dialkoxy groups dissolved in an inert liquid diluent at a temperature below 25° C. where said reaction medium has an iron content of less than 10 p. p. m.

2. The process of claim 1 wherein the dialkoxy benzyl alcohol is 3-methoxy-4-ethoxy benzyl alcohol.

3. The process of claim 1 wherein the dialkoxy benzyl alcohol is 3,4-dimethoxy benzyl alcohol.

4. The process of claim 1 wherein the dialkoxy benzyl alcohol is 3,4-diethoxy benzyl alcohol.

5. In the preparation of a dialkoxy benzyl chloride by the hydrochlorination of the corresponding alcohol, the steps comprising concurrently adding under substantially anhydrous reaction conditions hydrogen chloride and a solution of a dialkoxy benzyl alcohol containing 1 to 5 carbon atoms in the dialkoxy groups dissolved in an inert liquid diluent into a portion of said inert liquid diluent, said solution and said diluent having an iron content of less than 10 p. p. m. and maintaining the reaction temperature below about 5° C.

6. The process of claim 5 wherein the dialkoxy benzyl alcohol is 3-methoxy-4-ethoxy benzyl alcohol.

7. The process of claim 5 wherein the dialkoxy benzyl alcohol is 3,4-dimethoxy benzyl alcohol.

8. The process of claim 5 wherein the dialkoxy benzyl alcohol is 3,4-diethoxy benzyl alcohol.

References Cited in the file of this patent

UNITED STATES PATENTS

| 1,872,227 | Bennett et al. | Aug. 16, 1932 |
| 2,542,216 | Somogyi | Feb. 20, 1951 |

OTHER REFERENCES

Norris: American Chemical Jour., vol. 38, pps. 638–639 (1907).

Huntress: "Organic Chlorine Compounds" (1948), John Wiley & Sons, N. Y., p. 1161.